(12) United States Patent
Suyama

(10) Patent No.: US 10,774,713 B2
(45) Date of Patent: Sep. 15, 2020

(54) REDUCING AGENT SUPPLY DEVICE

(71) Applicant: TOYOTA JIDOSHA KABUSHIKI KAISHA, Toyota-shi (JP)

(72) Inventor: Kingo Suyama, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/167,635

(22) Filed: May 27, 2016

(65) Prior Publication Data

US 2016/0348556 A1 Dec. 1, 2016

(30) Foreign Application Priority Data

May 29, 2015 (JP) .................................. 2015-109729

(51) Int. Cl.
*F01N 3/20* (2006.01)
*F01N 9/00* (2006.01)
*F01N 11/00* (2006.01)

(52) U.S. Cl.
CPC ........... *F01N 3/208* (2013.01); *F01N 3/2066* (2013.01); *F01N 9/00* (2013.01); *F01N 11/00* (2013.01); *F01N 2610/142* (2013.01); *F01N 2610/144* (2013.01); *F01N 2610/146* (2013.01); *F01N 2610/1433* (2013.01); *F01N 2610/1493* (2013.01); *F01N 2900/08* (2013.01);
(Continued)

(58) Field of Classification Search
CPC ............... F01N 11/00; F01N 2610/142; F01N 2610/1433; F01N 2610/144; F01N 2610/146; F01N 2610/1493; F01N 2900/08; F01N 2900/1806; F01N 9/00; F01N 3/208; Y02T 10/47
USPC .................................................. 60/286, 303
See application file for complete search history.

(56) References Cited

U.S. PATENT DOCUMENTS

2008/0148716 A1* 6/2008 Nishibu ................ F01N 3/2066
60/295
2010/0071351 A1* 3/2010 Nishimura .............. F01N 3/206
60/286
(Continued)

FOREIGN PATENT DOCUMENTS

DE  10 2004 054 238 A1   5/2006
DE  10 2006 061 731 A1   7/2008
FR       2 981 689 A1    4/2013
(Continued)

*Primary Examiner* — Phutthiwat Wongwian
*Assistant Examiner* — Diem T Tran
(74) *Attorney, Agent, or Firm* — Oblon, McClelland, Maier & Neustadt, L.L.P.

(57) ABSTRACT

A reducing agent supply device includes a tank, an adding valve, a pump, and an electronic control unit. The adding valve is configured to receive the reducing agent supplied from the tank and inject the reducing agent. The pump is configured to send the reducing agent from the tank and suction the reducing agent back into the tank. The electronic control unit is configured to open the adding valve and suction the reducing agent back into the tank as a purge control when the internal combustion engine is commanded to stop. The electronic control unit is configured to increase an amount of a return suction of the reducing agent during the purge control as an amount of the reducing agent, remaining in a supply path and the adding valve when the stop command is given, increases.

1 Claim, 11 Drawing Sheets

(52) U.S. Cl.
CPC ....... *F01N 2900/1806* (2013.01); *Y02T 10/24* (2013.01); *Y02T 10/47* (2013.01)

(56) References Cited

U.S. PATENT DOCUMENTS

| | | | |
|---|---|---|---|
| 2012/0036838 A1* | 2/2012 | Furuya | F01N 3/208 60/285 |
| 2013/0032214 A1* | 2/2013 | Saby | B01D 19/0031 137/1 |

FOREIGN PATENT DOCUMENTS

| | | |
|---|---|---|
| JP | 2008-151094 | 7/2008 |
| JP | 2014-15855 A | 1/2014 |
| JP | 2014-015856 A | 1/2014 |

\* cited by examiner

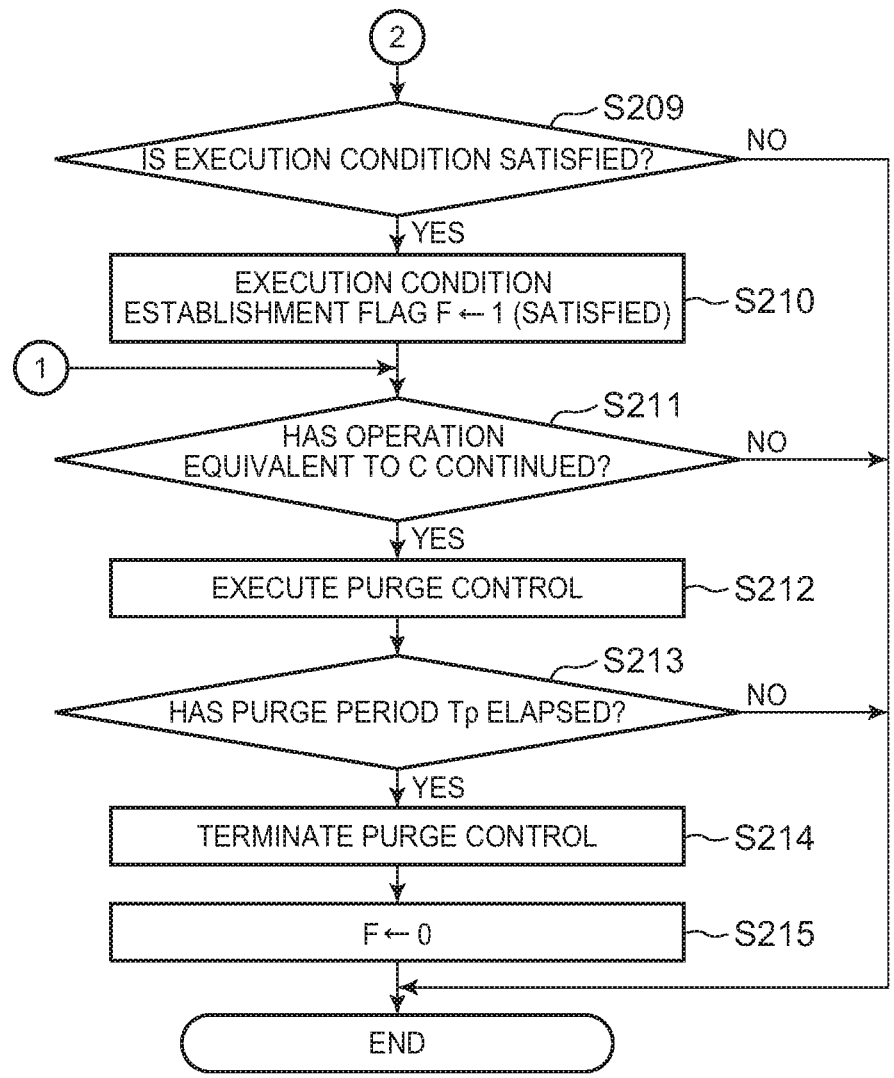
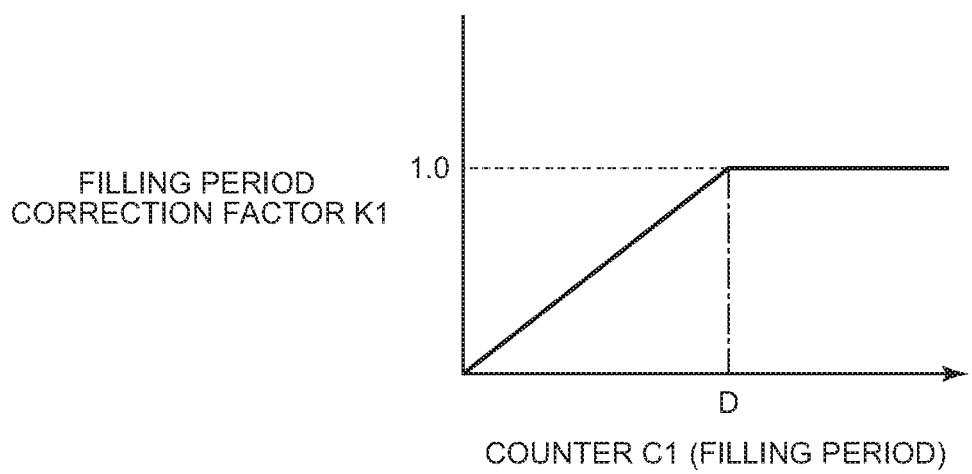

REDUCING AGENT SUPPLY DEVICE

INCORPORATION BY REFERENCE

The disclosure of Japanese Patent Application No. 2015-109729 filed on May 29, 2015 including the specification, drawings and abstract is incorporated herein by reference in its entirety.

BACKGROUND

1. Field of the Disclosure

The present disclosure relates to a reducing agent supply device,

2. Description of Related Art

An internal combustion engine mounted in a vehicle in which a selective reduction-type NOx purification catalyst is disposed is known. In this internal combustion engine, a reducing agent supply device is disposed to supply a reducing agent to a part of the exhaust passage on the upstream side of the NOx purification catalyst so that exhaust gas is purified of NOx by reduction by the NOx purification catalyst.

The reducing agent supply device that is disclosed in Japanese Patent Application Publication No. 2014-15856 (JP 2014-15856 A) is provided with an adding valve that injects the reducing agent into a part in the exhaust passage on the upstream side of the NOx purification catalyst, a tank that is connected to the adding valve via a supply path, and a pump for supplying the reducing agent in the tank into the adding valve or suctioning the reducing agent in the adding valve and the supply path back into the tank.

This reducing agent supply device executes a purge control for suctioning the reducing agent in the adding valve and the supply path back into the tank by operating the pump in a state where the adding valve is open based on a stop command for the internal combustion engine. When this purge control is executed, the reducing agent can be inhibited from remaining in the adding valve and the supply path after the internal combustion engine is stopped and the reducing agent can be inhibited from freezing in the adding valve and the supply path until the internal combustion engine is started next time after the internal combustion engine is stopped.

JP 2014-15856 A also discloses the execution of the purge control continuing until the return suction amount of the reducing agent reaches a predetermined reference value and a value that is equal to or higher than a capacity of the supply path being adopted as the reference value. The value that is equal to or higher than the internal capacity of the supply path is adopted as the reference valise as described above so that the remaining of the reducing agent in the adding valve and the supply path after a purge control termination is further reliably prevented.

BRIEF SUMMARY

When the value that is equal to or higher than the capacity of the supply path is adopted as the reference value described above, the return suction of the reducing agent based on the purge control is executed to a more-than-necessary extent in a case where the amount of the reducing agent remaining in the supply path when the internal combustion engine is commanded to stop is less than the reference value. Accordingly, the purge control continues even after the reducing agent in the supply path is completely suctioned back into the tank, and then the exhaust gas in the exhaust passage flows into the tank via the adding valve and the supply path during the continuation of the purge control. This inflow of the exhaust gas into the lank might cause the reducing agent in the lank to be deteriorated by the exhaust gas.

It is conceivable that the adding valve, which is open during the execution of the purge control, is closed at a predetermined timing during the execution of the same control so that the exhaust gas inflow from the exhaust passage is suppressed. When the adding valve is closed, however, it is inevitable that the reducing agent in the supply path is unlikely to be suctioned back into the tank. When the reducing agent remains in the supply path in this case, the reducing agent remains without being suctioned back into the tank. Then, the purpose of the purge control might not be achieved.

The present disclosure provides a reducing agent supply device that is capable of inhibiting exhaust gas in an exhaust passage from flowing into a tank.

A reducing agent supply device according to an aspect of the present disclosure includes a tank, an adding valve, a pump, and an electronic control unit. The tank is configured to accommodate a reducing agent. The adding valve is configured to receive the reducing agent supplied from the tank via a supply path and inject the reducing agent into an exhaust passage of an internal combustion engine. The pump is configured to send the reducing agent from the tank to the supply path and suction the reducing agent back into the tank from the supply path. The electronic control unit is configured to open the adding valve by controlling the adding valve and suction the reducing agent back into the tank from the supply path by controlling the pump as a purge control when the internal combustion engine is commanded to stop. The electronic control unit is configured to increase an amount of a return suction of the reducing agent during the purge control as an amount of the reducing agent, remaining in the supply path and the adding valve when the stop command is given, increases. According to this aspect, the amount of the return suction of the reducing agent in the supply path and the adding valve into the tank during the purge control can be increased or decreased in accordance with the amount of the reducing agent remaining in the supply path and the adding valve when the internal combustion engine is commanded to stop. Accordingly, a more-than-necessary return suction of the reducing agent during the purge control can be suppressed, and an inflow of exhaust gas in the exhaust passage into the tank attributable to the more-than-necessary return suction of the reducing agent can be suppressed. In addition, the adding valve does not have to be closed during the execution of the purge control for the inflow of the exhaust gas into the tank to be suppressed.

In the reducing agent supply device according to the aspect described above, the electronic control unit may be configured to fill the supply path and the adding valve with the reducing agent when the internal combustion engine is in operation. The electronic control unit may be configured to stop the filling when the internal combustion engine is commanded to stop. The electronic control unit may be configured to increase the amount of the return suction of the reducing agent as a period continuing until the filling is stopped after the filling is initiated lengthens when the filling is stopped before the reducing agent filling into the supply path and the adding valve is completed. In a case where the filling is stopped based on the stop command for the internal combustion engine before the completion of the reducing agent filling based on the above-described filling control, the amount of the reducing agent remaining in the supply path and the adding valve when the internal combustion engine is commanded to stop is increased as the period continuing until the filling is stopped after the filling is initiated lengthens. In view of this, the electronic control unit is configured to increase the amount of the return suction of the reducing agent as the period continuing until the filling is stopped after the filling is initiated lengthens when the filling is stopped before the completion of the reducing agent filling based on the filling control. Accordingly, a sensor or the like for detecting the amount of the reducing agent remaining in the supply path and the adding valve when the internal combustion engine is commanded to stop does not have to be disposed, and the amount of the reducing agent in the supply path and the adding valve suctioned back into the tank during the purge control can be increased or decreased in accordance with the remaining amount of the reducing agent.

In the reducing agent supply device according to the aspect described above, the electronic control unit may be configured to calculate the amount of the reducing agent remaining in the supply path and the adding valve when the internal combustion engine is commanded to stop. The electronic control unit may be configured to control the amount of the return suction of the reducing agent in accordance with the calculated remaining amount.

In the reducing agent supply device according to the aspect described above, the electronic control unit may be configured to adjust the amount of the return suction of the reducing agent by adjusting an execution period of the purge control.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is a flowchart illustrating the purge control execution procedure;

FIG. 5 is a graph illustrating a change in a filling period correction factor K1 with respect to a change in a counter C1;

DETAILED DESCRIPTION OF EMBODIMENTS

Figure 1:
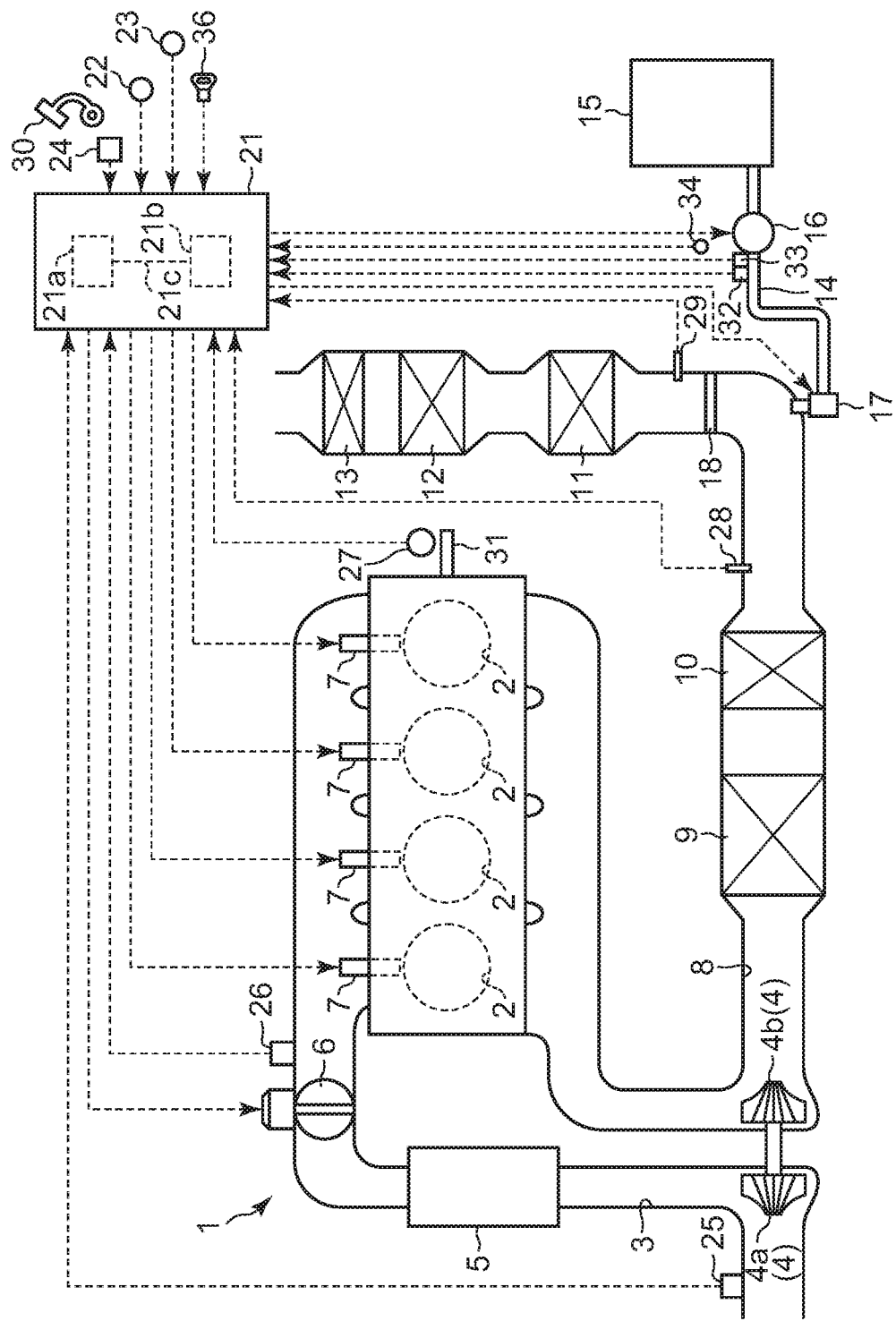
FIG. 1 is a schematic drawing illustrating an entire internal combustion engine to which a reducing agent supply device is applied.

Hereinafter, a first embodiment of a reducing agent supply device will be described with reference to FIGS. 1 to 7. As illustrated in FIG. 1, an intake passage 3 is connected to combustion chambers 2 of an internal combustion engine 1 that is mounted in a vehicle. In this intake passage 3, a compressor wheel 4a of a turbocharger 4, an intercooler 5, and an intake throttle valve 6 are disposed in order from its upstream side. Air passing through the intake passage 3 is suctioned into the combustion chambers 2 of the internal combustion engine 1 and a fuel from fuel injection valves 7 is injection-supplied into the combustion chambers 2 of the internal combustion engine 1. The internal combustion engine 1 is driven when this fuel is burned in the combustion chambers 2. Exhaust gas resulting from the combustion of the fuel in the combustion chambers 2 is sent to an exhaust passage 8 that is connected to the combustion chambers 2. In the exhaust passage 8, a turbine wheel 4b of the turbocharger 4, a first oxidation catalyst 9, a filter 10, a first NOx purification catalyst 11, a second NOx purification catalyst 12, and a second oxidation catalyst 13 are disposed in order from its upstream side.

The first oxidation catalyst 9 removes carbon monoxide (CO) and hydrocarbon (HC) by oxidation. The filter 10 collects particulate matter (PM) in the exhaust gas. The first NOx purification catalyst 11 and the second NOx purification catalyst 12 are selective reduction catalysts that purify the exhaust gas of NOx by reduction with a reducing agent. Specifically, the reducing agent such as urea water is added to the exhaust gas at a part of the exhaust passage 8 on the upstream side of the first NOx purification catalyst 11, and then the urea water is hydrolyzed in response to heat of the exhaust gas and ammonia (NH3) is generated. This generated ammonia is adsorbed onto the first NOx purification catalyst 11 and the second NOx purification catalyst 12, and NOx reduction in these catalysts is performed. This reduction causes the NOx in the exhaust gas to be removed. The second oxidation catalyst 13 performs an oxidation treatment on the ammonia flowing out to a downstream side from the second NOx purification catalyst 12.

The reducing agent supply device for supplying the reducing agent (urea water) to the part of the exhaust passage 8 on the upstream side of the first NOx purification catalyst 11 is disposed in the internal combustion engine 1. This reducing agent supply device is provided with an adding valve 17 for injecting the urea water to the part of the exhaust passage 8 on the upstream side of the first NOx purification catalyst 11 and on the downstream side of the filter 10. The urea water that is added to the exhaust gas in the exhaust passage 8 by the adding valve 17 is dispersed in the form of finer mist by a dispersion plate 18 which is disposed on the downstream side of the adding valve 17 and the upstream, side of the first NOx purification catalyst 11. The reducing agent supply device is provided with a pump 16 and a tank 15, too. The pump 16 is connected to the adding valve 17 via a pipe 14. The tank 15 is connected to the pump 16 and stores the urea water. The pump 16 pumps up the urea water in the tank 15 and supplies the urea water to the pipe 14 and the adding valve 17 by performing a positive rotation and suctions the urea water in the adding valve 17 and the pipe 14 back into the tank 15 by performing a reverse rotation.

An electronic control unit 21 is disposed in the vehicle in which the internal combustion engine 1 is mounted. The electronic control unit 21 is provided with an engine control unit 21a and an addition control unit 21b. The engine control unit 21a performs various types of controls on the internal combustion engine 1. The addition control unit 21b performs a driving control on the pump 16 and the adding valve 17. The engine control unit 21a and the addition control unit 21b are connected to each other by a communication cable 21c of an in-vehicle network (CAN) and share necessary information with each other by intercommunication via the communication cable 21c (CAN).

The following sensors are connected to an input port of the electronic control unit 21. •A water temperature sensor 22 that detects a cooling water temperature of the internal combustion engine 1. •An outside air temperature sensor 23 that detects an outside air temperature.

•An ignition switch 36 that is operated when a driver of the vehicle manually begins to start the internal combustion engine 1 or stops an operation of the internal combustion engine 1. •An accelerator position sensor 24 that detects an operation amount of an accelerator pedal 30 (accelerator operation amount) that is operated by the driver.

•An air flow meter 25 that detects the amount of air passing through the intake passage 3. •An intake pressure sensor 26 that detects a pressure of the intake passage 3 on the downstream side of the intake throttle valve 6 (intake pressure).

•A crank position sensor 27 for detecting a rotation speed of a crankshaft 31 of the internal combustion engine 1. •An exhaust gas temperature sensor 28 that detects a temperature of the exhaust gas at a part of the exhaust passage 8 on the downstream side of the filter 10.

•A NOx sensor 29 that detects the amount of NOx in the exhaust gas at the part of the exhaust passage 8 on the upstream side of the first NOx purification catalyst 11. •A pressure sensor 32 that detects a pressure of the urea water which is supplied to the adding valve 17 (pressure in the pipe 14).

•A temperature sensor 33 that detects a temperature of the urea water which is supplied to the adding valve 17. •A rotation speed sensor 34 that detects a rotation speed of the pump 16. A driving circuit for the fuel injection valves 7, a driving circuit for the intake throttle valve 6, a driving circuit for the pump 16, a driving circuit for the adding valve 17, and the like are connected to an output port of the electronic control unit 21.

The engine control unit 21a of the electronic control unit 21 discerns operation states of the internal combustion engine 1 based on detection signals input from the sensors and outputs command signals to the driving circuits connected to the output port, such as those for the fuel injection valves 7 and the intake throttle valve 6, in accordance with the discerned engine operation states. Then, a fuel injection control regarding the internal combustion engine 1, an opening degree control regarding the intake throttle valve 6, and the like are conducted through the electronic control unit 21 (engine control unit 21a). The addition control unit 21b of the electronic control unit 21 outputs command signals to the driving circuits, such as those for the pump 16 and the adding valve 17, in accordance with the discerned engine operation states. Then, a driving control regarding the pump 16, a driving control regarding the adding valve 17, and the like are conducted through the electronic control unit 21 (addition control unit 21b).

Figure 2:
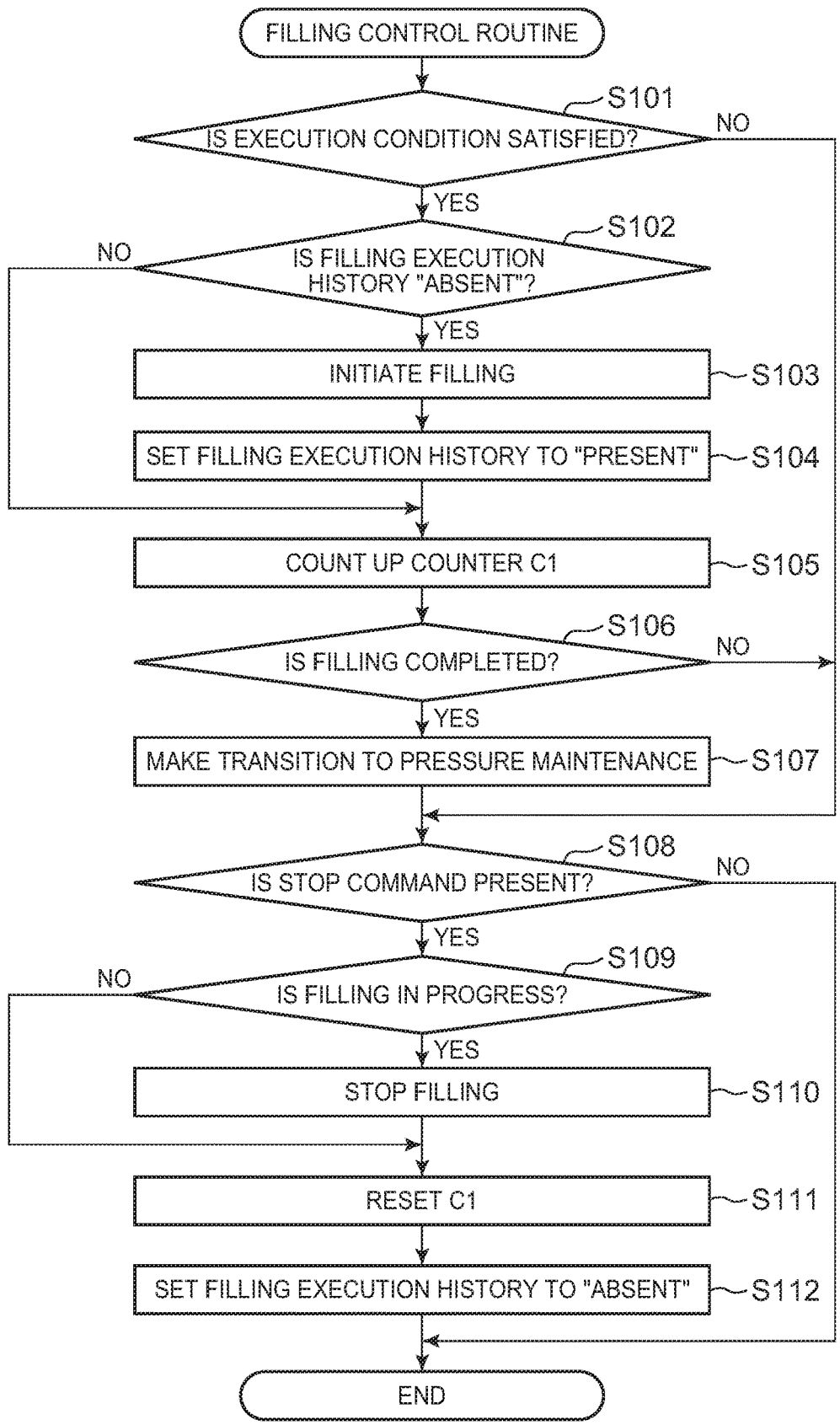
FIG. 2 is a flowchart illustrating a filling control execution procedure.

A filling control for filling the adding valve 17 and the pipe 14 (supply path) with the urea water when the internal combustion engine 1 is started will be described below. FIG. 2 is a flowchart illustrating a filling control routine for filling the adding valve 17 and the pipe 14 (supply path) with the urea water when the internal combustion engine 1 is started. This filling control routine is periodically executed on a predetermined time interrupt basis through the addition control unit 21b of the electronic control unit 21.

The addition control unit 21b determines whether or not an execution condition for filling the adding valve 17 and the pipe 14 with the urea water based on the filling control is satisfied as the processing of Step 101 (S101) of the filling control routine. Examples of this execution condition include an ON operation of the ignition switch 36 being performed by the driver so that the internal combustion engine 1 is started and an elapse of a predetermined period of time after the ON operation of the ignition switch 36. The addition control unit 21b determines that the execution condition is satisfied when all the conditions including the ON operation of the ignition switch 36 being performed and the elapse of the predetermined period of time after the ON operation are satisfied.

In the case of a positive determination in S101 with the execution condition for filling the adding valve 17 and the pipe 14 with the urea water based on the filling control satisfied, a series of processing of S102 to S107 is executed. The processing of S102 to S107 of the filling control routine is to execute a processing for initiating the urea water filling into the adding valve 17 and the pipe 14, a processing for determining that the filling is completed, and a processing subsidiary to the initiation and the completion.

The addition control unit 21b determines, as the processing of S102, whether or not a filling execution history is set to "absent". The filling execution history is used for a determination of whether or not the urea water filling into the adding valve 17 and the pipe 14 has been performed during a current operation of the internal combustion engine 1. The processing proceeds to S103 in a case where the filling execution history is "absent".

The addition control unit 21b initiates the urea water filling into the adding valve 17 and the pipe 14, as the processing of S103, by allowing the positive rotation of the pump 16 and discharging the urea water in the tank 15 into the pipe 14. In this case, a state where no urea water remains in the adding valve 17 and the pipe 14 is assumed, and the pump 16 is driven such that the pump 16 in the positive rotation has a maximum urea water discharge capacity, the purpose of which is to quickly complete the urea water filling into the adding valve 17 and the pipe 14.

The addition control unit 21b sets the filling execution history to "present" as the subsequent processing of S104. Then, the processing proceeds to S105. When the filling execution history is set to "present" as described above, a negative determination is made in S102, and thus the processing proceeds to S105 with S103 and S104 skipped. The addition control unit 21b counts up a counter C1 by "1" as the processing of S105. This counter C1 is counted up for each execution cycle of the filling control routine after the filling execution history is set to "present", and thus is a value equivalent to a period when the urea water filling into the adding valve 17 and the pipe 14 is executed (filling period). Then, The processing proceeds to S106.

The addition control unit 21b determines, as the processing of S106, whether or not the urea water filling into the adding valve 17 and the pipe 14 is completed. Specifically, the addition control unit 21b measures the elapsed time from the initiation of the positive rotation of the pump 16 for filling the adding valve 17 and the pipe 14 with the urea water and determines that the filling is completed based on the elapsed time reaching a length of time required for the completion of the filling (hereinafter, referred to as a required time Tfull). The required time Tfull is set as a length of time that is required for the adding valve 17 and the pipe 14 to be filled with the urea water by the urea water being discharged at the maximum discharge capacity of the pump 16 in a state where no urea water remains in the adding valve 17 and the pipe 14. The processing proceeds to S107 in the case of a positive determination in S106.

The addition control unit 21b makes a transition to a processing for maintaining the pressure of the urea water which is supplied to the adding valve 17 (pressure in the pipe 14) at a given target value as the processing of S107. In other words, the driving of the pump 16 for the pump 16 in the positive rotation to reach the maximum urea water discharge capacity is stopped and the rotation speed of the pump 16 (corresponding to a urea water discharge amount) is adjusted so that the pressure of the urea water supplied to the adding valve 17 reaches the target value. In this manner, the pressure is maintained at the target value.

Even in the event of a temporary reduction in the pressure of the urea water due to the addition of the urea water from the adding valve 17, the pressure is immediately raised to the target value by the discharge of the urea water from the pump 16 when the pressure of the urea water supplied to the adding valve 17 is maintained at the target value after the urea water filling into the adding valve 17 and the pipe 14 is completed. Accordingly, after the completion of the urea water filling into the adding valve 17 and the pipe 14, the state where the urea water filling into the adding valve 17 and the pipe 14 is completed is maintained, irrespective of the addition or non-addition of the urea water from the adding valve 17, by the driving of the pump 16 for maintaining the pressure of the urea water supplied to the adding valve 17 at the target value.

The processing proceeds to S108 after the execution of the processing of S107. The processing proceeds to S108 as well in a case where it is determined in S106 that the filling is not completed and in a case where it is determined in S101 that the filling control execution condition is not satisfied. A series of processing of S108 to S112 of the filling control routine are a processing relating to the urea water filling performed when the internal combustion engine 1 is stopped and a processing for initializing the counter C1 and the filling execution history described above when the internal combustion engine 1 is stopped.

The addition control unit 21b determines the presence or absence of a stop command for the internal combustion engine 1 as the processing of S108. Specifically, the internal combustion engine 1 is commanded to stop by the engine control unit 21a of the electronic control unit 21 when the driver turns OFF the ignition switch 36 in order to stop the internal combustion engine 1. A positive determination is made in S108 when the stop command is given, and a negative determination is made in S108 when the stop command is absent. In the case of the negative determination in S108, the addition control unit 21b temporarily terminates the filling control routine.

In the case of the positive determination in S108, the processing proceeds to S109. The addition control unit 21b determines, as the processing of S109, whether or not the urea water filling into the adding valve 17 and the pipe 14 is in progress, that is, whether or not a negative determination has been made in S106, The processing proceeds to S110 in the case of a determination that the urea water filling is in progress. The addition control unit 21b stops the pump 16 and stops the urea water filling into the adding valve 17 and the pipe 14 as the processing of S110. Then, the processing proceeds to S111. The processing proceeds to S111 as well in a case where it is determined in S109 that the urea wafer filling is not in progress.

The addition control unit 21b resets (initializes) the counter C1 to an initial value of "0" as the processing of Sill, and then sets (initializes) the filling execution history to an initial state of "absent" as the processing of S112. Then, the electronic control unit temporarily terminates the filling control routine after the execution of the processing of S112. As is apparent from the content of the processing of the filling control routine, the addition control unit 21b that executes this routine fills the adding valve 17 and the pipe 14 with the urea water in the tank 15 as the above-described filling control while serving as a control unit that stops the filling when the internal combustion engine 1 is commanded to stop.

A purge control will be described below. This purge control is performed so that the urea water remaining in the adding valve 17 and the pipe 14 (supply path) is suctioned back into the tank 15 when the internal combustion engine 1 is stationary. This purge control inhibits the urea water from remaining in the adding valve 17 and the pipe 14 after the internal combustion engine 1 is stopped and inhibits the urea water from freezing until the internal combustion engine 1 is started next time after the internal combustion engine 1 is stopped.

The above-described purge control is realized by the pump 16 being allowed to perform a reverse rotation in a state where the adding valve 17 is open and the reverse rotation continuing until a purge period Tp is over. During the reverse rotation of the pump 16 for the purge control, the pump 16 is driven so that the pump 16 in the reverse rotation reaches a maximum urea water suctioning capacity, the purpose of which is to quickly complete the return suction of the urea water.

Figure 3:
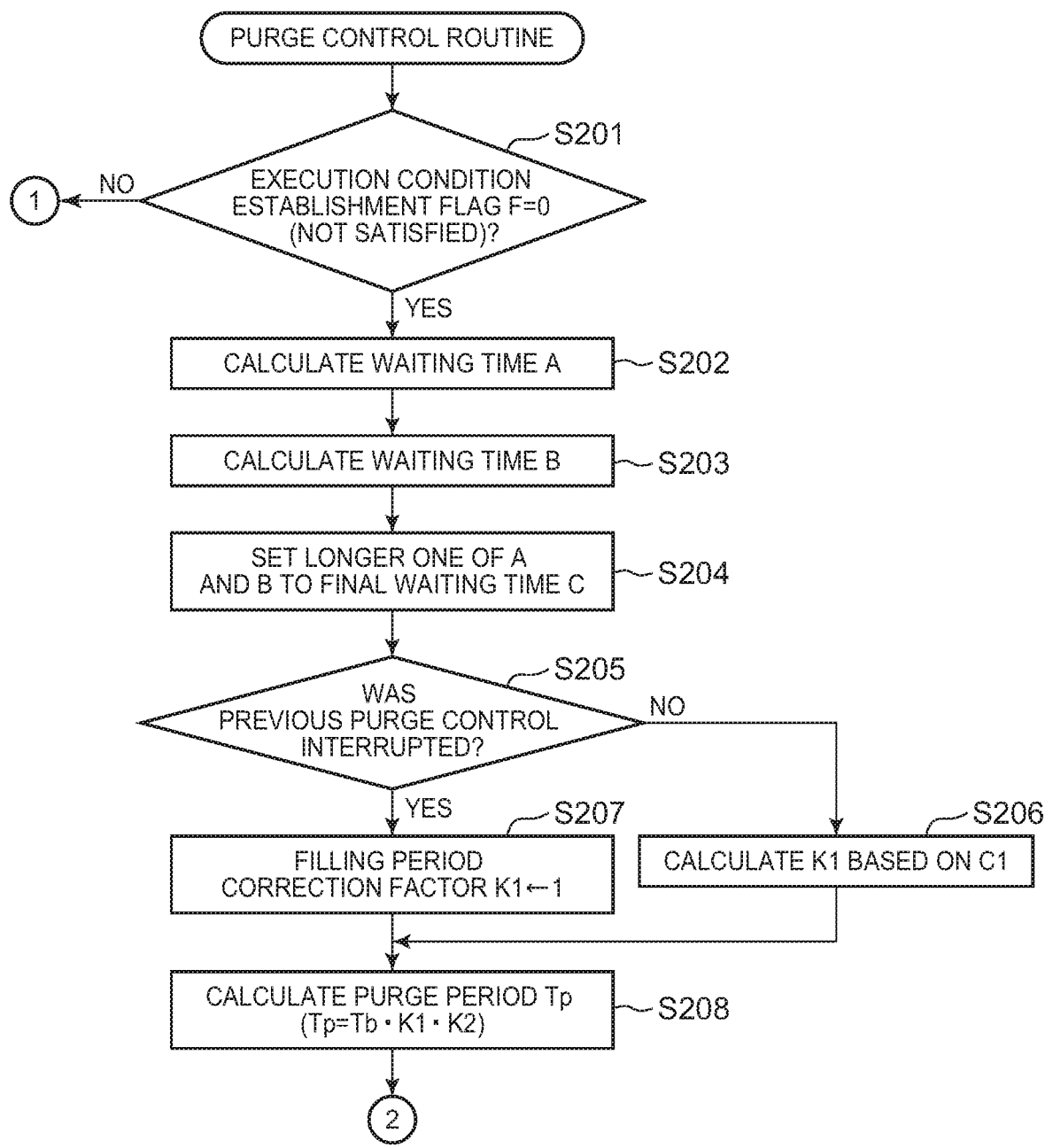
FIG. 3 is a flowchart illustrating a purge control execution procedure.

FIGS. 3 and 4 are flowcharts illustrating a purge control routine that allows the urea water remaining in the adding valve 17 and the pipe 14 (supply path) to be suctioned back into the tank when the internal combustion engine 1 is stationary. This purge control routine is periodically executed on, for example, a predetermined time interrupt basis through the addition control unit 21b of the electronic control unit 21.

According to the purge control routine, when the stop command for the internal combustion engine 1 is given based on an OFF operation of the ignition switch 36, the purge control is executed after idling of the internal combustion engine 1 equivalent to a final waiting time C from the stop command is performed. Because of this idling preceding the execution of the purge control, the adding valve can be cooled by the exhaust gas which has a relatively low temperature during the idling even in a situation in which the adding valve is heated by high-temperature exhaust gas and rises in temperature, examples of which include a case where a high-load operation of the internal combustion engine 1 is performed prior to the stop command.

The addition control unit 21b determines, as the processing of S201 (FIG. 3) of the purge control routine, whether or not an execution condition establishment flag F is "0" (not satisfied). The execution condition establishment flag F is used for a determination of whether or not a purge control execution condition is currently satisfied. The processing proceeds to S202 in the case of a positive determination in S201. The processing of S202 to S204 of the purge control routine is to calculate the final waiting time C before the execution of the purge control.

The addition control unit 21b calculates, as the processing of S202, a waiting time A as an idling time for the engine 1 that is required for the adding valve 17 to be cooled after the internal combustion engine 1 is commanded to stop. Specifically, the addition control unit 21b obtains the temperature of the adding valve 17 based on the temperature of the exhaust gas that is detected by the exhaust gas temperature sensor 28 and calculates the waiting time A based on the temperature of the adding valve 17 and the outside air temperature that is detected by the outside air temperature sensor 23.

In addition, the addition control unit 21b calculates, as the processing of S203, a waiting time B as a length of time that is assumed to be required for an occupant to leave the vehicle after the internal combustion engine 1 is commanded to stop. The waiting time B is calculated based on the cooling water temperature of the internal combustion engine 1 subjected to the stop command. Assuming that the purge control is initiated before the waiting time B is over, the occupant might feel uncomfortable with an operating sound or the like during the reverse rotation of the pump 16 attributable to the control. The waiting time B is a value that is determined such that the above-described occupant's discomfort resulting from the execution of the purge control is suppressed.

The addition control unit 21b sets the longer one of the waiting time A and the waiting time B to the final waiting time C as the subsequent processing of S204. Then, the processing proceeds to S205. The processing of S205 to S208 of the purge control routine is to calculate the purge period Tp described above. The purge period Tp is calculated by the use of the equation of "$Tp=Tb \cdot K1 \cdot K2 \ldots (1)$" based on a base period Tb, a filling period correction factor K1, and an environment correction factor K2.

The base period Tb is a period that is required when the urea water that the adding valve 17 and the pipe 14 are filled with (in a state where the urea water filling is completed) is completely suctioned back into the tank 15 based on the maximum suctioning capacity of the pump 16 during the reverse rotation. The base period Tb is a fixed value that is determined in advance in an experiment or the like. The filling period correction factor K1 is a value that is variably set in accordance with the counter C1 which has yet to be reset to "0" (corresponding to the filling period) when the internal combustion engine 1 is commanded to stop. The environment correction factor K2 is a value that is variably set in accordance with the temperature of the urea water which is detected by the temperature sensor 33.

The addition control unit 21b determines, as the processing of S205, whether or not the previously-performed purge control was interrupted. The interruption of the purge control occurs in a case where the urea water filling into the adding valve 17 and the pipe 14 based on the filling control is initiated by an ON operation of the ignition switch 36 being performed during the execution of the purge control. In a case where the previous purge control was not interrupted (S205: NO), the urea water filling is initiated in a state where no urea water remains in the adding valve 17 and the pipe 14 in the filling control preceding the current purge control.

Accordingly, the counter C1 (corresponding to the urea water filling period) that is counted up for each execution cycle of the filling control routine after the initiation of the urea water filling based on the filling control is a value which corresponds to the amount of the urea water in the adding valve 17 and the pipe 14 (filling amount) increasing as a result of the urea water filling. Still, the amount of the urea water in the adding valve 17 and the pipe 14 does not increase whereas the counter C1 continues to be counted up after the completion of the urea water filling into the adding valve 17 and the pipe 14, that is, after the elapsed time from the initiation of the positive rotation of the pump 16 for the urea water filling reaches the length of time required for the completion of the filling (required time Tfull). Accordingly, after the completion of the urea water fining into the adding valve 17 and the pipe 14, the counter C1 does not become the value which corresponds to the amount of the urea water in the adding valve 17 and the pipe 14 (filling amount).

The processing proceeds to S206 in a case where it is determined in S205 that the previously-performed purge control was not interrupted. The addition control unit 21b calculates, as the processing of S206, the filling period correction factor K1 based on the counter C1 immediately before the resetting to "0" with the internal combustion engine 1 commanded to stop. A relationship between this calculated filling period correction factor K1 and the counter C1 described above is illustrated in FIG. 5.

As is apparent from FIG. 5, the counter C1 gradually increases from "0" after the initiation of the urea water filling into the adding valve 17 and the pipe 14 based on the filling control, that is, after the filling execution history is set to "present". The filling period correction factor K1 gradually increases from an initial value as the counter C1 increases from "0", and reaches an upper limit value of "1.0" when the counter C1 reaches a predetermined valise D. The predetermined value D is a value that corresponds to a length of time which is required for the completion of the filling after the initiation of the urea water filling through the filling control in a state where no urea water remains in the adding valve 17 and the pipe 14.

Accordingly, the filling period correction factor K1 that is calculated based on the counter C1 gradually increases in accordance with an increase in the filling amount while the amount of the urea water in the adding valve 17 and the pipe 14 (filling amount) reaches a value at the completion of the filling from "0", that is, until the counter C1 reaches the predetermined value D. Then, when the counter C1 reaches the predetermined valise D (when the filling amount reaches the value at the completion of the filling), the filling period correction factor K1 becomes "1.0".

The processing proceeds to S208 after the processing of S206 (FIG. 3) is performed. The addition control unit 21b calculates the purge period Tp by the use of the above equation (1) as the processing of S208. The purge period Tp that is calculated in this case changes depending on the filling period correction factor K1 calculated based on the counter C1. When the counter C1 is lower than the predetermined value D, the filling period correction factor K1 becomes less than "1.0" as the counter C1 decreases, and the purge period Tp calculated by the use of the filling period correction factor K1 shortens. As the purge period Tp shortens, the amount of the urea water in the adding valve 17 and the pipe 14 suctioned back into the tank 15 during the purge control which is performed based on the purge period Tp decreases.

The processing proceeds to S207 in a case where it is determined in S205 that the previously-performed purge control was interrupted. The addition control unit 21b substitutes the filling period correction factor K1 with "1.0" as the processing of S207, and then calculates the purge period Tp by the use of the above equation (1) as the processing of S208.

The previous purge control being interrupted means that the filling control was initiated by an ON operation of the ignition switch 36 being performed during the execution of the purge control. In this case, the urea water filling is initiated in a state where the urea water remains in the adding valve 17 and the pipe 14 in the filling control preceding the current purge control. Accordingly, when the counter C1 that is counted up for each execution cycle of the filling control routine after the initiation of the filling control is lower than the predetermined value D, the counter C1 becomes a value which is excessively lower than the amount of the urea water in the adding valve 17 and the pipe 14 (filling amount).

Assuming that the filling period correction factor K1 is calculated based on the counter C1 pertaining to this case, the urea water in the adding valve 17 and the pipe 14 might not be completely suctioned back into the tank 15 during the current purge control performed based on the purge period Tp when the purge period Tp calculated by the use of the above equation (1) is shortened by the filling period correction factor K1. However, when the purge period Tp is prevented from being shortened by the filling period correction factor K1 being fixed to "1.0" through the processing of S205, the incomplete return suction of the urea water in the adding valve 17 and the pipe 14 into the tank 15 during the current purge control performed based on the purge period Tp is suppressed.

The processing proceeds to S209 (FIG. 4) after the execution of the processing of S208. The processing of S209 to S215 is to execute a processing for executing and terminating the purge control and a processing subsidiary to the execution and the termination.

The addition control unit 21b determines whether or not the purge control execution condition is satisfied as the processing of S209. This execution condition is satisfied when the internal combustion engine 1 is commanded to stop. The stop command for the internal combustion engine 1 is given when the driver turns OFF the ignition switch 36 in order to stop the engine 1. When it is determined in S209 that the execution condition is not satisfied, the addition control unit 21b temporarily terminates this purge control routine.

The processing proceeds to S210 in a case where it is determined in S209 that the execution condition is satisfied. The addition control unit 21b sets the execution condition establishment flag F to "1 (satisfied)" as the processing of S210. Then, the processing proceeds to S211. After the execution condition establishment flag F is set to "1", a negative determination is made in S201 (FIG. 3), and the processing proceeds to S211 (FIG. 4) with S202 to S208 skipped.

The addition control unit 21b determines, as the processing of S211, whether or not the idling of the internal combustion engine 1 equivalent to the final waiting time C has continued since the internal combustion engine 1 was commanded to stop. In the case of a negative determination in S211, the addition control unit 21b temporarily terminates the purge control routine. The processing proceeds to S212 in the case of a positive determination in S211. The addition control unit 21b executes the purge control as the processing of S212. In other words, the urea water in the adding valve 17 and the pipe 14 is suctioned back into the tank 15 by the pump 16 in the positive rotation being stopped and then the adding valve 17 being opened and the pump 16 being allowed to perform a reverse rotation. Then, the processing proceeds to S213.

The addition control unit 21b determines, as the processing of S213, whether or not the purge period Tp has elapsed since the initiation of the purge control. In the case of a negative determination in S213, the addition control unit 21b temporarily terminates the purge control routine. The processing proceeds to S214 in the case of a positive determination in S213. The addition control unit 21b terminates the purge control as the processing of S214. In other words, the pump 16 in the reverse rotation is stopped and the adding valve 17 is closed. Then, the addition control unit 21b resets (initializes) the execution condition establishment flag F to "0 (not satisfied)" as the subsequent processing of S215, and then temporarily terminates the purge control routine.

An operation of the reducing agent supply device will be described below. This device executes the filling control when the internal combustion engine 1 is started and executes the purge control when the internal combustion engine 1 is stationary. Hereinafter, how these filling control and purge control are executed will be described in detail with reference to FIGS. 6 and 7.

Figure 6:
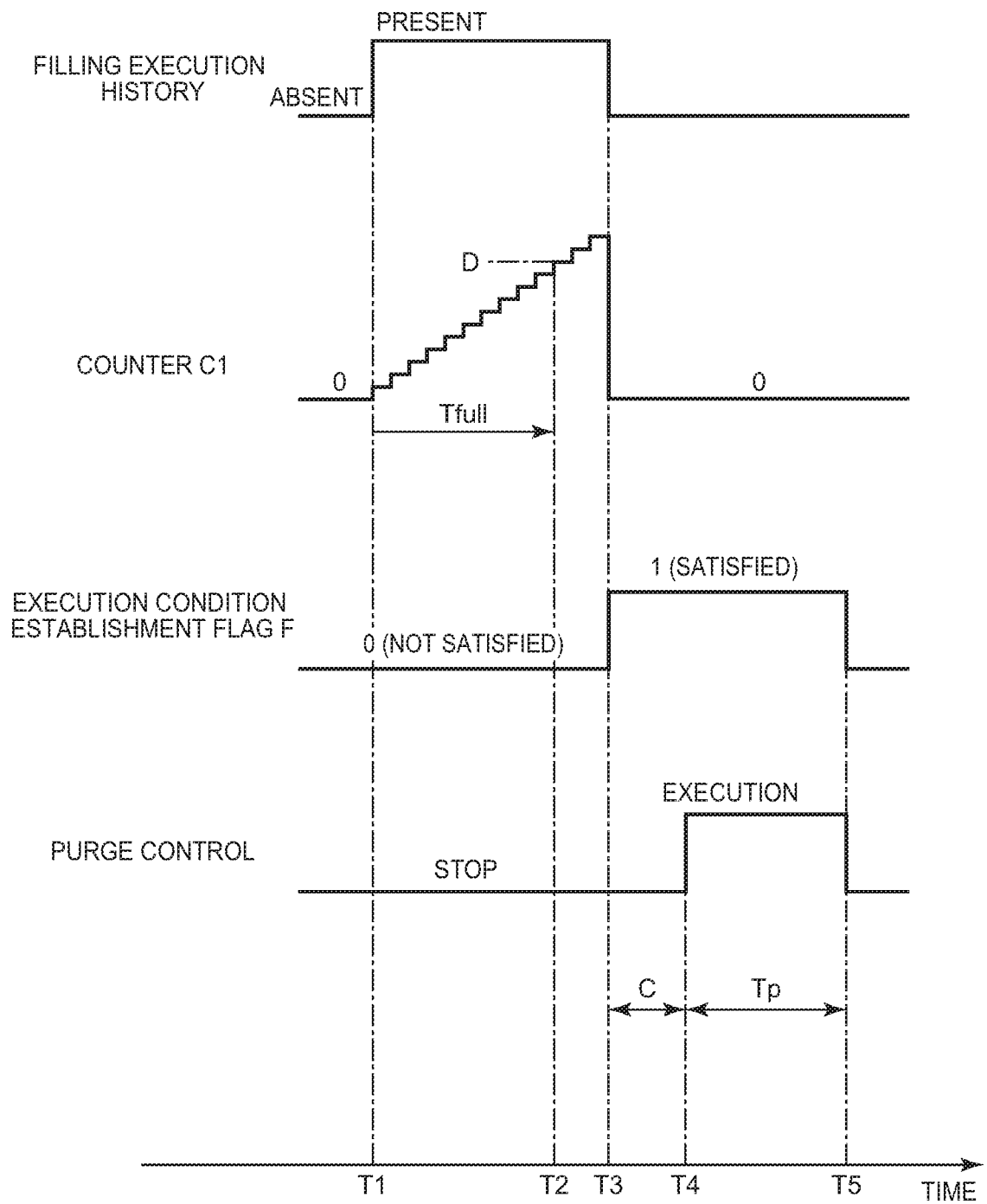
FIG. 6 is a time chart illustrating how a filling execution history changes, how the counter C1 changes, how an execution condition establishment flag F is set, and how a purge control is executed until the internal combustion engine is stopped after the internal combustion engine is started.
Figure 7:
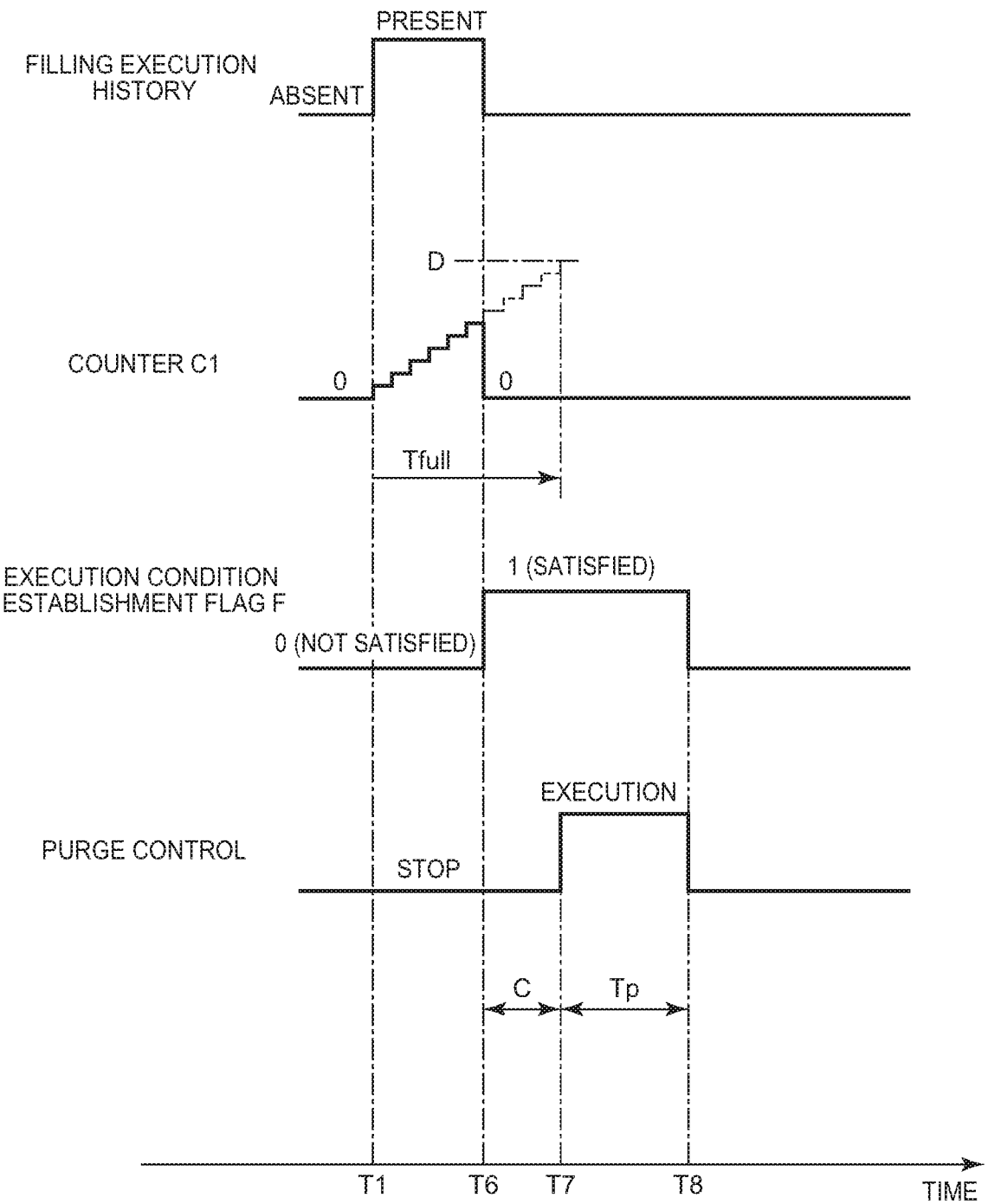
FIG. 7 is a time chart illustrating how the filling execution history changes, how the counter C1 changes, how the execution condition establishment flag F is set, and how the purge control is executed until the internal combustion engine is stopped after the internal combustion engine is started.

FIGS. 6 and 7 are time charts illustrating how the filling execution history changes, how the counter C1 changes, how the execution condition establishment flag F is set, and how the purge control is executed until the internal combustion engine 1 is stopped after the internal combustion engine 1 is started. FIG. 6 shows an example pertaining to a case where the urea water filling into the adding valve 17 and the pipe 14 is initiated based on the filling control when the infernal combustion engine 1 is started and then the purge control is executed after the completion of the filling. FIG. 7 shows an example pertaining to a case where the urea water filling into the adding valve 17 and the pipe 14 is initiated when the internal combustion engine 1 is started and then the purge control is executed before the filling is completed.

In the example of FIG. 6, the urea water filling is initiated (timing T1 in FIG. 6) when the execution condition for filling the adding valve 17 and the pipe 14 with the urea water based on the filling control when the internal combustion engine 1 is started is satisfied in a state where no urea water remains in the adding valve 17 and the pipe 14. In this case, the filling execution history changes from "absent" to "present". Then, in the filling control, the adding valve 17 and the pipe 14 are filled with the urea water by the pump 16 being allowed to perform a positive rotation to discharge the urea water at the maximum discharge capacity. In addition, after the initiation of the urea water filling into the adding valve 17 and the pipe 14, the counter C1 is counted up with time. In this case, the counter C1 increases as the amount of the urea water in the adding valve 17 and the pipe 14 increases.

When the length of time from the initiation of the filling reaches the required time Tfull, that is, when the urea water filling into the adding valve 17 and the pipe 14 is completed (timing T2), a transition is made to the processing for maintaining the pressure of the urea water which is supplied to the adding valve 17 (pressure in the pipe 14) at the given target value. In this processing, the rotation speed of the pump 16 is adjusted so that the pressure of the urea water in the pipe 14 reaches the target value. After the length of time from the initiation of the filling reaches the required time Tfull, that is, after the urea water filling into the adding valve 17 and the pipe 14 is completed (after T2), the counter C1 that continues to be counted up with time does not correspond to the amount of the urea water in the adding valve 17 and the pipe 14.

In the event of the stop command for the internal combustion engine 1 (timing T3) after the urea water filling into the adding valve 17 and the pipe 14 is completed (after T2), the counter C1 is reset to "0" and the filling execution history changes from "present" to "absent". In addition, with the internal combustion engine 1 commanded to stop, the purge control execution condition is satisfied and the execution condition establishment flag F changes from "0 (not satisfied)" to "1 (satisfied)". Then, the purge control for the return suction of the urea water in the adding valve 17 and the pipe 14 into the tank 15 is executed when the idling of the internal combustion engine 1 equivalent to the final waiting time C continues from the point in time when the internal combustion engine 1 is commanded to stop (timing T4). This purge control is realized by the pump 16 in the positive rotation being stopped and then the pump 16 being allowed to perform the reverse rotation with the adding valve 17 open.

The purge control continues until the purge period Tp is over after the initiation of the execution. Then, when the purge period Tp is over after the initiation of the execution of the purge control (timing T5), the pump 16 performing the reverse rotation so that the urea water in the adding valve 17 and the pipe 14 is suctioned back into the tank 15 is stopped and the open adding valve 17 is closed. In this manner, the purge control is terminated. The purge period Tp that is used in this purge control shortens as the counter C1 decreases when the counter C1 is lower than the predetermined value D illustrated in FIG. 5 and is not shortened depending on the counter C1 when the counter C1 is equal to or higher than the predetermined value D.

Likewise, in the example of FIG. 7, the urea water filling into the adding valve 17 and the pipe 14 based on the filling control is initiated and the filling execution history changes from "absent" to "present" when the execution condition for the filling control is satisfied during the start of the internal combustion engine 1 in a state where no urea water remains in the adding valve 17 and the pipe 14 (T1). Then, after the initiation of the urea water filling into the adding valve 17 and the pipe 14, the counter C1 that is counted up with time increases as the amount of the urea water in the adding valve 17 and the pipe 14 increases.

In this example, the stop command for the internal combustion engine 1 is given before the length of time from the initiation of the filling reaches the required time Tfull, that is, before the urea, water filling into the adding valve 17 and the pipe 14 is completed (timing T6). When the internal combustion engine 1 is commanded to stop, the pump 16 is stopped, which causes the urea water filling into the adding valve 17 and the pipe 14 to be stopped. In addition, in this case, the counter C1 is reset to "0" and the filling execution history changes from "present" to "absent". In addition, when the internal combustion engine 1 is commanded to stop, the purge control execution condition is satisfied and the execution condition establishment flag F changes from "0 (not satisfied)" to "1 (satisfied)".

Then, the purge control for the return suction of the urea water in the adding valve 17 and the pipe 14 into the tank 15 is executed when the idling of the internal combustion engine 1 equivalent to the final waiting time C continues from the point in time when the internal combustion engine 1 is commanded to stop (timing T7). In this case, the purge control is executed with the pump 16 allowed to perform the reverse rotation by the adding valve 17 being opened. Then, when the purge period Tp is over after the initiation of the execution of the purge control (timing T8), the pump 16 is stopped, the adding valve 17 is closed, and the purge control is terminated.

In a case where the internal combustion engine 1 is commanded to stop before the completion of the urea water filling into the adding valve 17 and the pipe 14 based on the filling control as in the example of FIG. 7, the adding valve 17 and the pipe 14 are partially filled with the urea water in the event of the stop command. Accordingly, the purge control continues even after the urea water in the adding valve 17 and the pipe 14 is completely suctioned back into the tank 15 when the purge control subsequent to the stop command for the internal combustion engine 1 is executed on an assumption that the adding valve 17 and the pipe 14 are completely filled with the urea water. As a result, the exhaust gas in the exhaust passage 8 flows into the tank 15 via the adding valve 17 and the pipe 14 during the continuation of the purge control and the urea water in the tank 15 might be deteriorated by the exhaust gas.

In order to address this problem, the addition control unit 21b increases the return suction amount of the urea water based on the purge control as the amount of the urea water remaining in the adding valve 17 and the pipe 14 when the internal combustion engine 1 is commanded to stop increases. The electronic control unit 21 that is provided with the addition control unit 21b which functions to this end serves as a control unit that increases the return suction amount of the urea water based on the purge control as the amount of the urea water remaining in the adding valve 17 and the pipe 14 when the internal combustion engine 1 is commanded to stop increases.

In a case where the internal combustion engine 1 is commanded to stop and the purge control is executed before the urea water filling into the adding valve 17 and the pipe 14 based on the fining control is completed, that is, before the counter C1 reaches the predetermined value D, the amount of the urea water remaining in the adding valve 17 and the pipe 14 when the stop command is given increases as the length of the period until the filling is stopped after the filling is initiated (filling period) increases. When the counter C1 is lower than the predetermined value D, the filling period correction factor K1 increases within a range of "0 to 1.0" as illustrated in FIG. 5 as the counter C1 increases, and thus the purge period Tp lengthens. Accordingly, in a case where the internal combustion engine 1 is commanded to stop before the completion of the urea water filling based on the filling control, the purge period Tp lengthens as the counter C1 immediately preceding the resetting based on the stop command increases, and the return suction amount of the urea water based on the purge control subsequent to the stop command increases.

In this manner, the return suction amount of the urea water based on the purge control can be increased or decreased in accordance with the amount of the urea water remaining in the adding valve 17 and the pipe 14 when the internal combustion engine 1 is commanded to stop. Accordingly, a more-than-necessary return suction of the urea water based on the purge control can be suppressed, and the inflow of the exhaust gas in the exhaust passage 8 into the tank 15 attributable to the more-than-necessary return suction of the urea water can be suppressed.

The following effects are achieved by this embodiment described above. (1) The more-than-necessary return suction of the urea water based on the purge control can be suppressed, and the inflow of the exhaust gas in the exhaust passage 8 into the tank 15 attributable to the more-than-necessary return suction of the urea water can be suppressed. In addition, the deterioration of the urea water in the tank 15 due to the exhaust gas flowing into the tank 15 can be suppressed.

(2) When the filling is stopped based on the stop command for the internal combustion engine 1 before the completion of the urea water filling based on the filling control, the return suction amount of the urea water based on the purge control subsequent to the stop command increases as the counter C1 (corresponding to the filling period) immediately preceding the resetting in the event of the stop command increases. Accordingly, a sensor or the like for detecting the amount of the urea water remaining in the adding valve 17 and the pipe 14 when the internal combustion engine 1 is commanded to stop does not have to be disposed, and the amount of the urea water in the adding valve 17 and the pipe 14 suctioned back into the tank 15 based on the purge control can be increased or decreased in accordance with the remaining amount of the urea water.

A second embodiment of the reducing agent supply device will be described below with reference to FIGS. 8 to 13. In this embodiment, the amount of the urea water in the adding valve 17 and the pipe 14 (filling amount V) is calculated and the purge period Tp is adjusted in accordance with the filling amount V pertaining to a case where the internal combustion engine 1 is commanded to stop instead of the purge period Tp being adjusted in accordance with the counter C1 (corresponding to the filling period) as in the first embodiment. The filling amount V pertaining to the case where the internal combustion engine 1 is commanded to stop is used as the amount of the urea water remaining in the adding valve 17 and the pipe 14 in that case.

Figure 8:
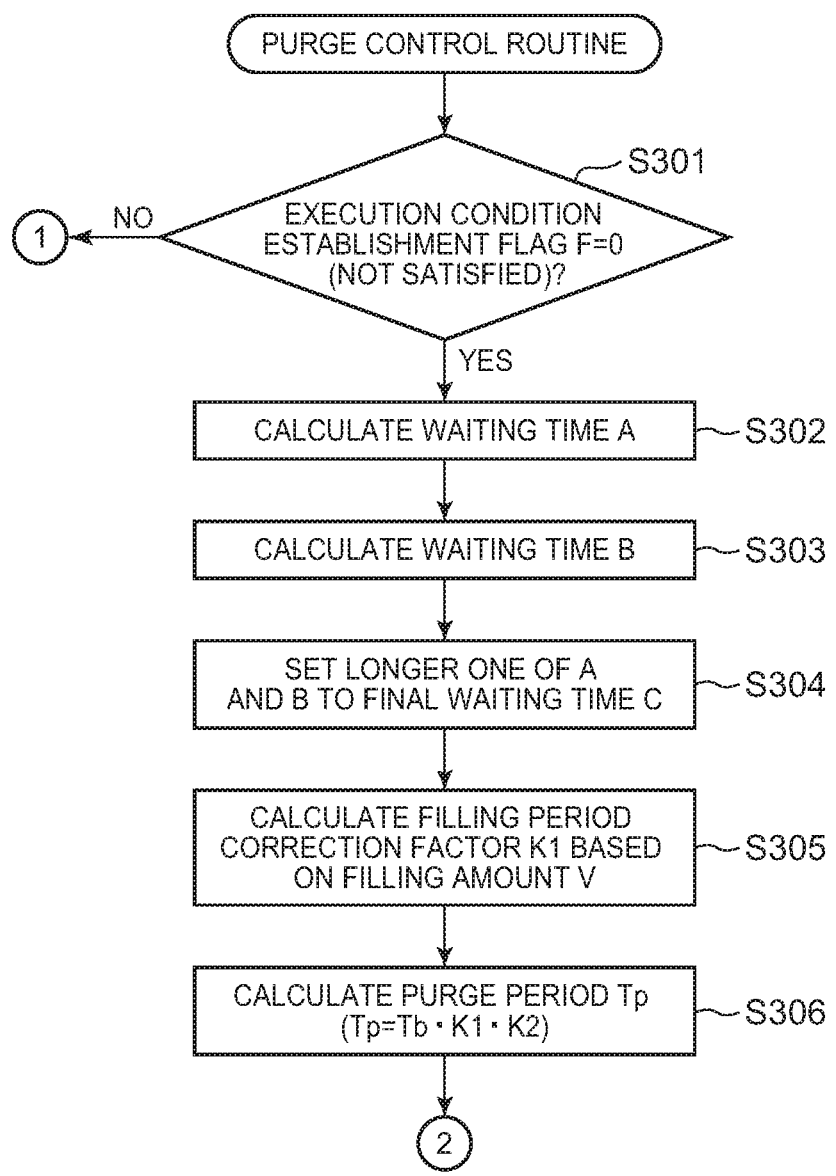
FIG. 8 is a flowchart illustrating a purge control execution procedure.
Figure 9:
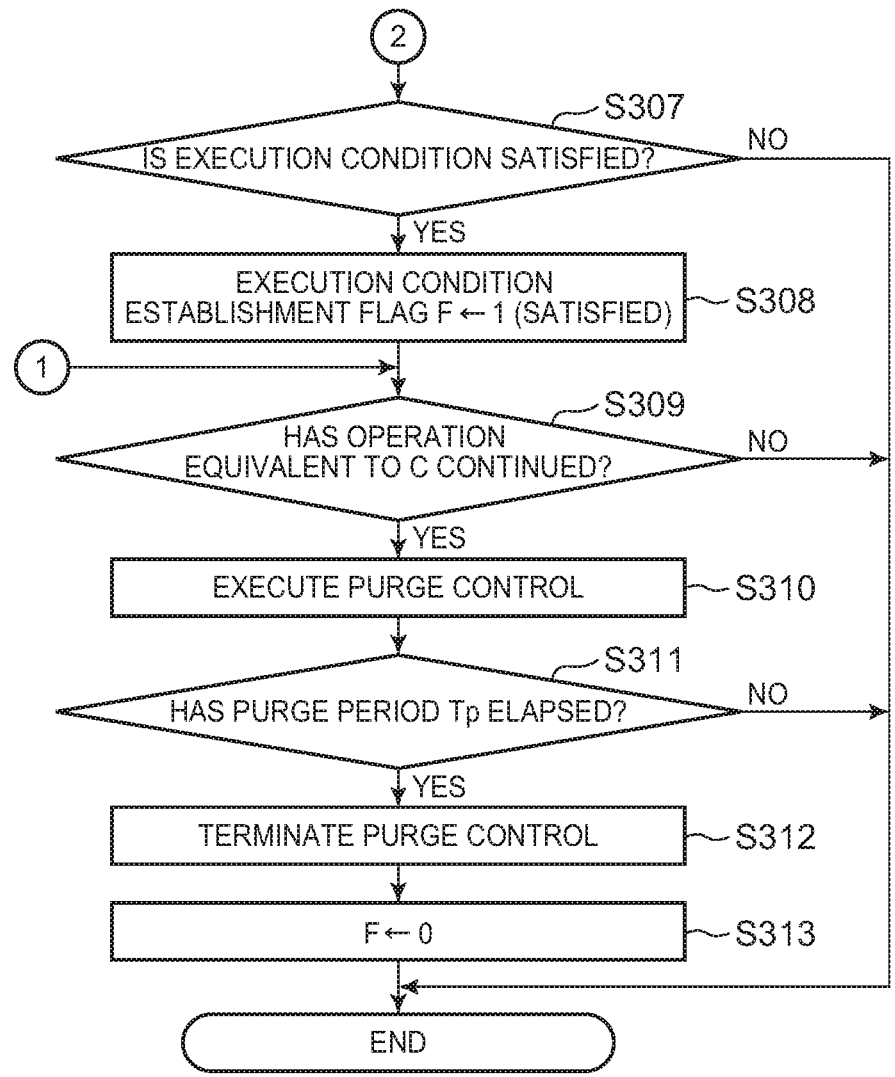
FIG. 9 is a flowchart illustrating the purge control execution procedure.

FIGS. 8 and 9 are flowcharts illustrating a purge control routine according to this embodiment. This purge control routine is also periodically executed on a predetermined time interrupt basis through the addition control unit 21b. The only difference between the purge control routine according to this embodiment and that of the first embodiment lies in the processing (S305) equivalent to S205 to S207 (FIG. 3) of the purge control routine illustrated in FIGS. 3 and 4.

In a case where it is determined in the processing of S301 (FIG. 9) that the execution condition establishment flag F is "0" (not satisfied), the addition control unit 21b calculates the waiting time A as the processing of S302, calculates the waiting time B as the processing of S303, and sets the longer one of the waiting time A and the waiting time B to the final waiting time C as the processing of S304. Then, the processing proceeds to S305. The addition control unit 21b calculates the filling period correction factor K1, as the processing of S305, based on the filling amount V that is the amount of the urea water in the adding valve 17 and the pipe 14.

Figure 10:
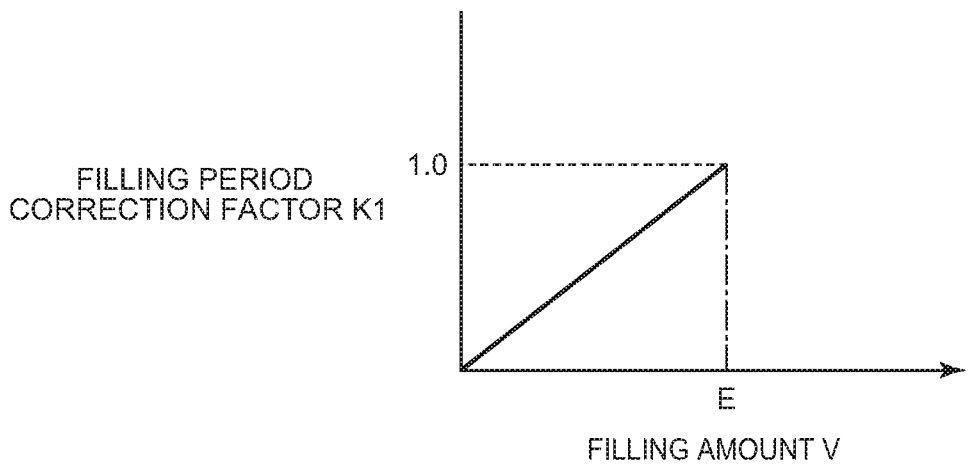
FIG. 10 is a graph illustrating a change in the filling period correction factor K1 with respect to a change in a filling amount V.

FIG. 10 shows a relationship between the filling amount V and the filling period correction factor K1 pertaining to a case where the filling control-based urea water filling into the adding valve 17 and the pipe 14 is performed in a state where no urea water remains in the adding valve 17 and the pipe 14. As is apparent from the drawing, the filling period correction factor K1 gradually increases from "0" after the initiation of the filling control-based urea water filling into the adding valve 17 and the pipe 14. The filling period correction factor K1 gradually increases from the initial value as the filling amount V increases, and reaches the upper limit value of "1.0" when the filling amount V reaches a predetermined value E. The predetermined value E is set to the total amount of the urea water in the adding valve 17 and the pipe 14 at the completion of the urea water filling based on the filling control.

The addition control unit 21b calculates the purge period Tp by using the above equation (1) as the subsequent processing of S306. The purge period Tp lengthens as the filling amount V increases until the filling control-based urea water filling into the adding valve 17 and the pipe 14 is completed after being initiated, that is, until the filling amount V reaches the predetermined value E in a state where no urea water remains in the adding valve 17 and the pipe 14. Then, the return suction amount of the urea water from the adding valve 17 and the pipe 14 based on the purge control pertaining to a case where the internal combustion engine 1 is commanded to stop and the purge control is performed during the filling increases as the purge period Tp is calculated to lengthen as described above.

The processing proceeds to S307 (FIG. 9) after the calculation of the purge period Tp in S306. The addition control unit 21b determines, as the processing of S307, whether or not the purge control execution condition is satisfied. When it is determined in S307 that the execution condition is not satisfied with the stop command for the internal combustion engine 1 not given, the addition control unit 21b temporarily terminates this purge control routine. The processing proceeds to S308 in a case where the stop command for the internal combustion engine 1 is given and it is determined in S307 that the execution condition is satisfied. The addition control unit 21b sets the execution condition establishment flag F to "1 (satisfied)" as the processing of S308. Then, the processing proceeds to S309. After the execution condition establishment flag F is set to "1", a negative determination is made in S301 (FIG. 8) and the processing proceeds to S309 (FIG. 9) with S302 to S308 skipped.

The addition control unit 21b determines, as the processing of S309, whether or not the idling of the internal combustion engine 1 equivalent to the final waiting time C has continued since the internal combustion engine 1 was commanded to stop. In the case of a negative determination in S309, the addition control unit 21b temporarily terminates the purge control routine. The processing proceeds to S310 in the case of a positive determination in S309. The addition control unit 21b executes the purge control as the processing of S310. Then, the processing proceeds to S311. The addition control unit 21b determines, as the processing of S311, whether or not the purge period Tp has elapsed since the initiation of the purge control. In the case of a negative determination in S311, the addition control unit 21b temporarily terminates the purge control routine. The processing proceeds to S312 in the case of a positive determination in S311. The addition control unit 21b terminates the purge control as the processing of S312. The addition control unit 21b resets (initializes) the execution condition establishment flag F to "0 (not satisfied)" as the subsequent processing of S313, and then temporarily terminates the purge control routine.

Figure 11:
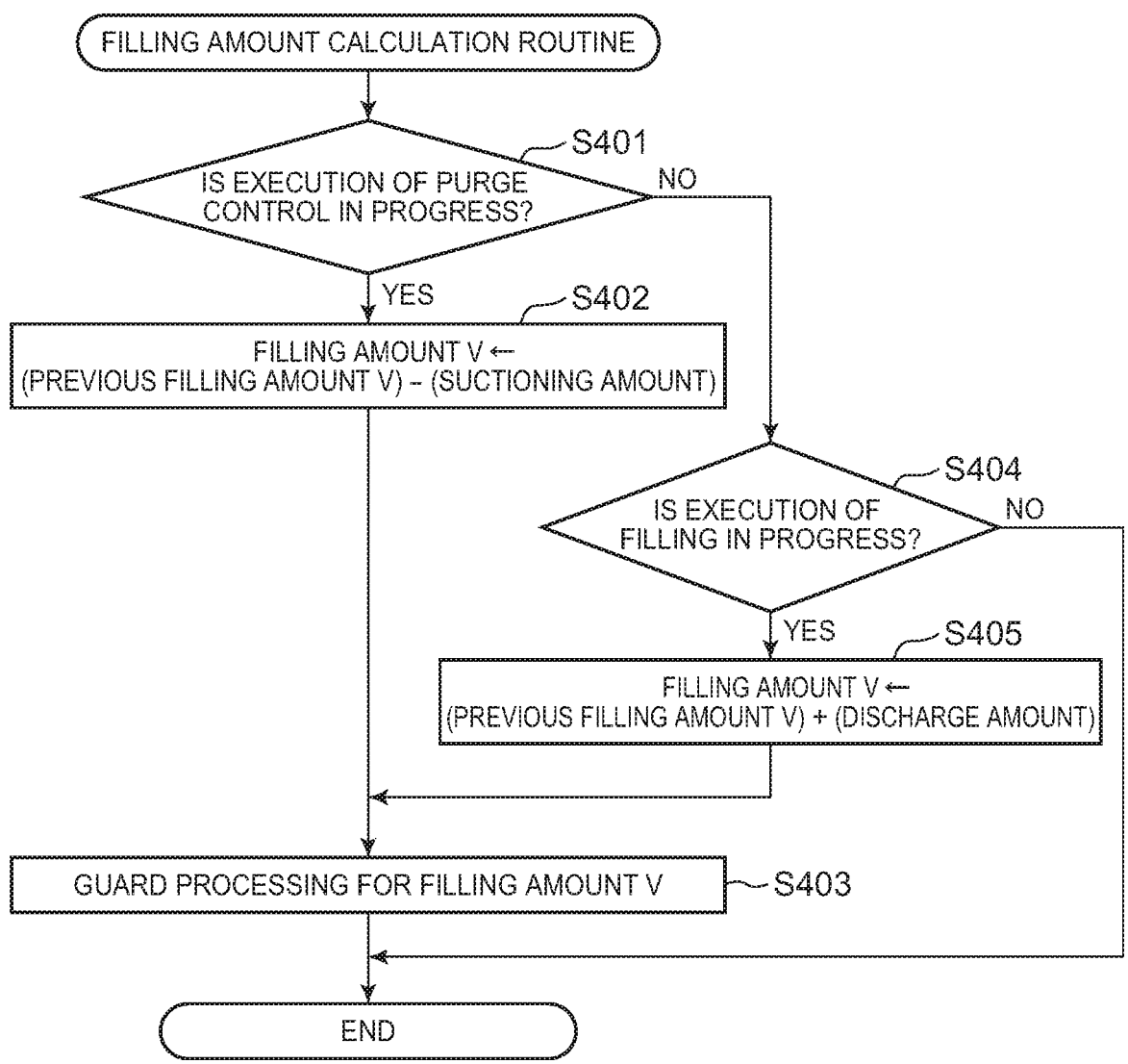
FIG. 11 is a flowchart illustrating a procedure for calculating the filling amount V.

FIG. 11 is a flowchart illustrating a fining amount calculation routine for calculating the filling amount V. This filling amount calculation routine is periodically executed on a predetermined time interrupt basis through the addition control unit 21b, The addition control unit 21b determines, as the processing of S401 of the filling amount calculation routine, whether or not the execution of the purge control is in progress. The processing proceeds to S402 in the case of a positive determination in S401.

The addition control unit 21b calculates the filling amount V, as the processing of S402, by using the following equation of "(current filling amount V)=(previous filling amount V)−(suctioning amount) . . . (2)". The suctioning amount that is used in equation (2) represents the amount of the urea water suctioned back into the tank 15 through the driving of the pump 16 during the predetermined period of time which is an execution cycle of the filling amount calculation routine. The suctioning amount that is used in equation (2) is calculated based on the rotation speed of the pump 16 during the reverse rotation which is detected by the rotation speed sensor 34. In addition, the filling amount V has an initial value of "0". As is apparent from equation (2), a value that is obtained by subtracting the suctioning amount from the filling amount V pertaining to the case of the previous execution of the filling amount calculation routine is the current filling amount V.

The processing proceeds to S404 in the case of a negative determination in S401. The addition control unit 21b determines, as the processing of S404, whether or not the filling control-based urea water filling into the adding valve 17 and the pipe 14 is in progress. In the case of a negative determination in S404, the addition control unit 21b temporarily terminates the filling amount calculation routine. In the case of a positive determination in S404, the processing proceeds to S405 and the filling amount V is calculated by the use of the following equation of "(current filling amount V)=(previous fining amount V)+(discharge amount) . . . (3)". The discharge amount that is used in equation (3) represents the amount of the urea water discharged from the pump 16 to the pipe 14 during the predetermined period of time which is the execution cycle of the filling amount calculation routine. The discharge amount that is used in equation (3) is calculated based on the rotation speed of the pump 16 during the positive rotation which is detected by the rotation speed sensor 34. As is apparent from equation (3), a value that is obtained by adding the discharge amount to the filling amount V pertaining to the case of the previous execution of the filling amount calculation routine is the current filling amount V.

The processing proceeds to S403 after the processing of either S402 or S405 is performed. The addition control unit 21b executes a guard processing for the filling amount V as the processing of S403, and then temporarily terminates the filling amount calculation routine. Specifically, the guard processing for the filling amount V is performed as follows, that is, the filling amount V is substituted with "0" when the filling amount V is a negative value and the filling amount V is substituted with the predetermined value E when the filling amount V is a value exceeding the predetermined value E. The addition control unit 21b temporarily terminates the filling amount calculation routine after the execution of the processing of S403.

In a case where the purge control is executed based on the stop command for the internal combustion engine 1 during the filling control-based urea water filling into the adding valve 17 and the pipe 14 in the filling amount calculation routine, the filling amount V that is calculated in S405 during the previous execution of the filling control routine is used as the previous filling amount V pertaining to S402. Accordingly, even in the event of the execution of the return suction of the urea water in the adding valve 17 and the pipe 14 into the tank 15 based on the purge control during the filling control-based urea water filling into the adding valve 17 and the pipe 14, the calculated filling amount V can be a value corresponding to the amount of the urea water in the adding valve 17 and the pipe 14.

In addition, in a case where the filling control is initiated based on the ON operation of the ignition switch 36 during the execution of the return suction of the urea water in the adding valve 17 and the pipe 14 into the tank 15 based on the purge control in the filling amount calculation routine, the filling amount V that is calculated in S402 during the previous execution of the filling control routine is used as the previous filling amount V pertaining to S405, Then, the filling amount V that is calculated in the same processing while the processing of S405 is previously performed is used as the previous filling amount V pertaining to S405. Accordingly, even when the filling control-based urea water filling into the adding valve 17 and the pipe 14 is initiated during the execution of the return suction of the urea water in the adding valve 17 and the pipe 14 into the tank 15 based on the purge control, the calculated filling amount V can be a value corresponding to the amount of the urea water in the adding valve 17 and the pipe 14.

Figure 12:
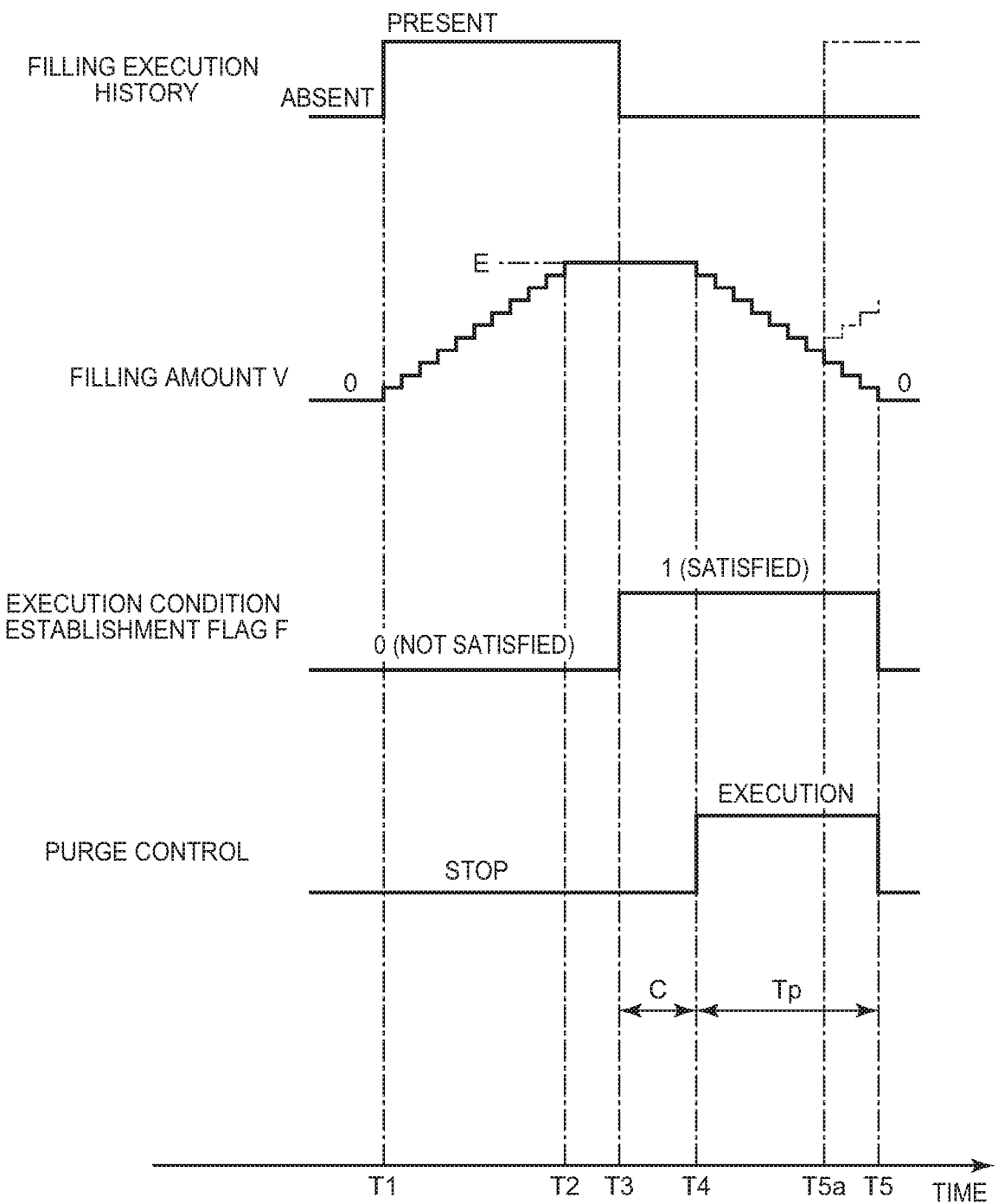
FIG. 12 is a time chart illustrating how the filling execution history changes, how the filling amount V changes, how the execution condition establishment flag F is set, and how the purge control is executed until the internal combustion engine is stopped after the internal combustion engine is started.
Figure 13:
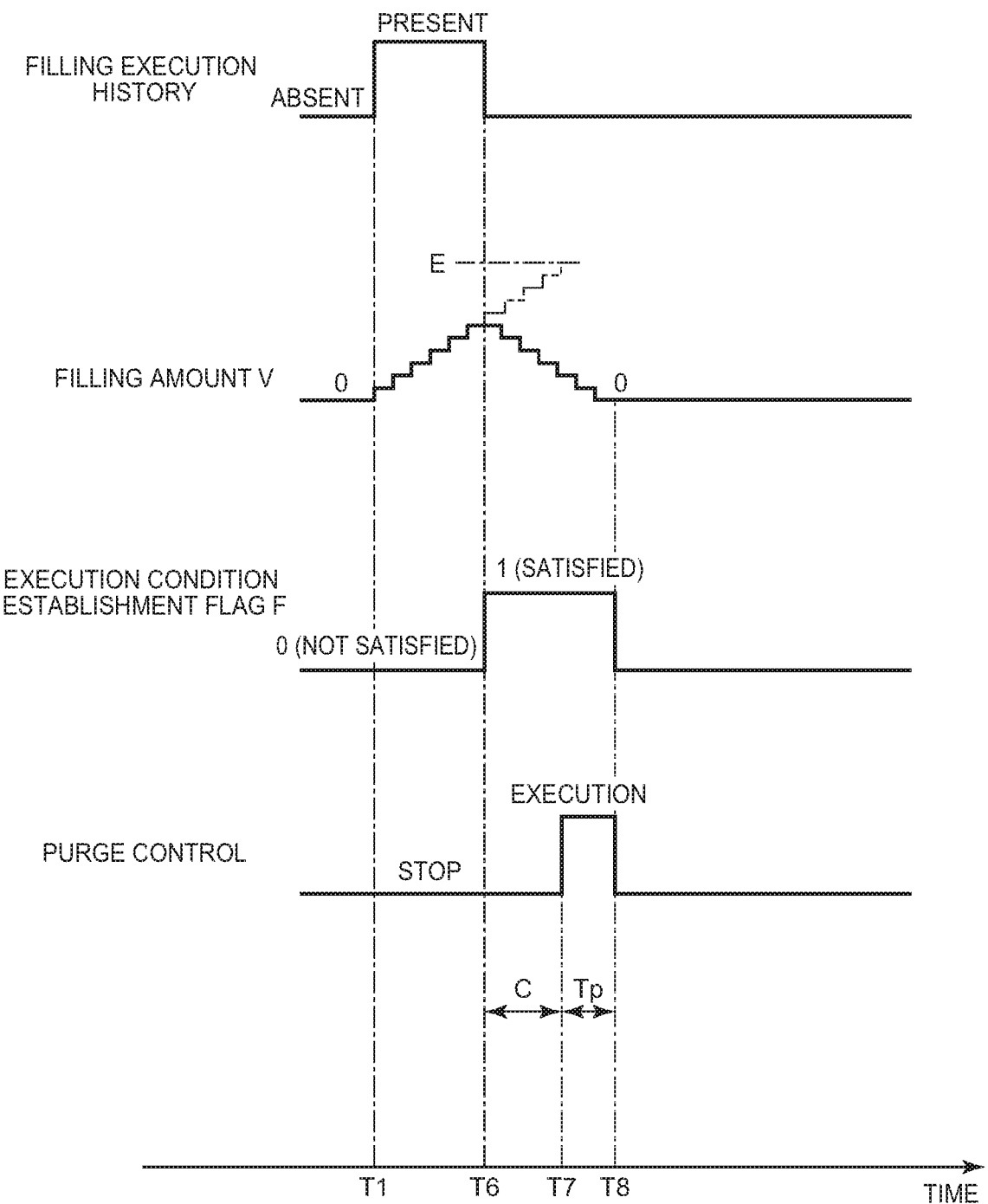
FIG. 13 is a time chart illustrating how the filling execution history changes, how the filling amount V changes, how the execution condition establishment flag F is set, and how the purge control is executed until the internal combustion engine is stopped after the internal combustion engine is started.

An operation of the reducing agent supply device will be described below. FIGS. 12 and 13 are time charts illustrating how the filling execution history changes, how the filling amount V changes, how the execution condition establishment flag F is set, and how the purge control is executed until the internal combustion engine 1 is stopped after the internal combustion engine 1 is started, FIG. 12 shows an example pertaining to a case where the urea water filling into the adding valve 17 and the pipe 14 is initiated based on the filling control when the internal combustion engine 1 is started and then the purge control is executed after the completion of the filling. FIG. 13 shows an example pertaining to a case where the urea water filling into the adding valve 17 and the pipe 14 is initiated when the internal combustion engine 1 is started and then the purge control is executed before the filling is completed.

In the example of FIG. 12, the filling control-based urea water filling into the adding valve 17 and the pipe 14 is initiated (timing T1 in FIG. 12) when the internal combustion engine 1 is started in a state where no urea water remains in the adding valve 17 and the pipe 14, and then the filling execution history changes from "absent" to "present". After the initiation of the urea water filling based on the filling control, the filling amount V increases as the amount of the urea water in the adding valve 17 and the pipe 14 increases. When the filling amount V reaches the predetermined value E, that is, when the urea water filling into the adding valve 17 and the pipe 14 is completed (timing T2), a transition is made to the processing for maintaining the pressure of the urea water which is supplied to the adding valve 17 (pressure in the pipe 14) at the given target value. In this processing, the rotation speed of the pump 16 is adjusted so that the pressure of the urea water in the pipe 14 reaches the target value. While this processing is performed, the filling amount V never exceeds the predetermined value E. This is because the filling amount V is prevented from exceeding the predetermined value E through the guard processing during the execution of the purge control prior to the processing or during the filling control-based urea water filling.

When the internal combustion engine 1 is commanded to stop (timing T3) after the completion of the urea water filling into the adding valve 17 and the pipe 14 (after T2), the filling execution history changes from "present" to "absent" and the execution condition establishment flag F changes from "0 (not satisfied)" to "1 (satisfied)" with the purge control execution condition satisfied. Then, the purge control for the return suction of the urea water in the adding valve 17 and the pipe 14 into the tank 15 is executed when the idling of the internal combustion engine 1 equivalent to the final waiting time C continues from the point in time when the internal combustion engine 1 is commanded to stop (timing T4). This purge control is terminated when the purge period Tp is over after the initiation of the execution (timing T5). The purge period Tp shortens as the filling amount V in the event of the stop command for the internal combustion engine 1 (T3) decreases. The filling amount V decreases in accordance with a decrease in the amount of the urea water in the adding valve 17 and the pipe 14 attributable to the return suction of the urea water into the tank 15 during the execution of the purge control, and becomes "0" when the purge control is terminated.

When the ON operation of the ignition switch 36 is performed (timing T5a) during the execution of the purge control (after T4), the filling control-based urea water filling into the adding valve 17 and the pipe is initiated in a state where the urea water in the adding valve 17 and the pipe 14 is partially suctioned back into the tank 15 with the purge control interrupted. In this case, the filling amount V, which was decreasing during the execution of the purge control, increases as the adding valve 17 and the pipe 14 are filled with the urea water based on the filling control after the interruption of the purge control. Accordingly, even after the filling control-based urea water filling into the adding valve 17 and the pipe 14 is initiated with the purge control interrupted, the filling amount V can be a value corresponding to the amount of the urea water in the adding valve 17 and the pipe 14.

In the example of FIG. 13, the filling control-based urea water filling into the adding valve 17 and the pipe 14 is initiated when the internal combustion engine 1 is started in a state where no urea water remains in the adding valve 17 and the pipe 14, and then the filling execution history changes from "absent" to "present" (T1). After the initiation of the urea water filling into the adding valve 17 and the pipe 14, the filling amount V increases as the amount of the urea water in the adding valve 17 and the pipe 14 increases.

In this example, the internal combustion engine 1 is commanded to stop before the filling amount V reaches the predetermined value E after the initiation of the filling, that is, before the completion of the urea water filling into the adding valve 17 and the pipe 14 (timing T6). When the internal combustion engine 1 is commanded to stop, the pump 16 is stopped, which causes the urea water filling into the adding valve 17 and the pipe 14 to be stopped. In addition, in this case, the filling execution history changes from "present" to "absent" and the execution condition establishment flag F changes from "0 (not satisfied)" to "1 (satisfied)" with the purge control execution condition satisfied.

Then, the purge control for the return suction of the urea water in the adding valve 17 and the pipe 14 into the tank 15 is executed when the idling of the internal combustion engine 1 equivalent to the final waiting time C continues from the point in time when the internal combustion engine 1 is commanded to stop (timing T7). This purge control is terminated when the purge period Tp is over after the initiation of the execution (liming T8), The purge period Tp pertaining to this case lengthens as the filling amount V in the event of the stop command for the internal combustion engine 1 increases, that is, as the amount of the urea water remaining in the adding valve 17 and the pipe 14 increases. Accordingly, in a case where the internal combustion engine 1 is commanded to stop before the completion of the urea water filling based on the filling control, the return suction amount of the urea water based on the purge control performed after the stop command is given increases as the amount of the urea water remaining in the adding valve 17 and the pipe 14 when the stop command is given increases.

In this manner, the return suction amount of the urea water based on the purge control can be increased or decreased in accordance with the amount of the urea water remaining in the adding valve 17 and the pipe 14 when the internal combustion engine 1 is commanded to stop. Accordingly, the more-than-necessary return suction of the urea water based on the purge control can be suppressed, and the inflow of the exhaust gas in the exhaust passage 8 into the tank 15 attributable to the more-than-necessary return suction of the urea water can be suppressed.

The following effects as well as an effect similar to (1) achieved by the first embodiment are achieved by this embodiment. (3) The filling amount V that is calculated in the filling amount calculation routine becomes the value corresponding to the amount of the urea water in the adding valve 17 and the pipe 14 even in a case where the filling control-based urea water filling is initiated with the purge control interrupted during the execution of the purge control and even in a case where the filling control-based urea water filling is initiated after the purge control is terminated without being interrupted as described above. Accordingly, when the purge control is performed with the internal combustion engine 1 commanded to stop during the filling control-based urea water filling into the adding valve 17 and the pipe 14, the filling amount V pertaining to a case where the stop command is given can become the value corresponding to the amount of the urea water in the adding valve 17 and the pipe 14 regardless of whether or not the previous purge control was interrupted. Accordingly, by the filling period correction factor K1 being calculated based on the filling amount V and the filling period correction factor K1 being used in the calculation of the purge period Tp for the current purge control, only a necessary amount of the return suction of the urea water can be performed in the current purge control, regardless of whether or not the previous purge control was interrupted, and the more-than-necessary return suction of the urea water can be suppressed.

The first and second embodiments described above can be modified as follows. •The situation in which the ignition switch 36 is turned OFF by the driver has been described as an example of the situation in which the internal combustion engine 1 is commanded to stop. However, in the case of an internal combustion engine that is automatically stopped or automatically restarted depending on a vehicle traveling situation or the like, examples of the situation can also include a situation in which a condition for automatically stopping the engine is satisfied.

•A reducing agent other than the urea water may be used.

What is claimed is:

1. A reducing agent supply device, comprising:
a tank configured to accommodate a reducing agent;
an adding valve configured to receive the reducing agent supplied from the tank via a supply path and inject the reducing agent into an exhaust passage of an internal combustion engine;

a pump configured to operate in a first direction to send the reducing agent from the tank to the supply path and to operate in a second direction to return the reducing agent back into the tank from the supply path; and an electronic control unit is configured to include a purge control that opens the adding valve and returns the reducing agent back into the tank from the supply path by controlling the pump when the internal combustion engine is commanded to stop, wherein the electronic control unit is configured to fill the supply path and the adding valve with the reducing agent when the internal combustion engine is in operation, the electronic control unit counting up a counter starting when the supply path begins to fill, wherein the electronic control unit is configured to stop the filling when the internal combustion engine is commanded to stop, the electronic control unit stopping the counter when the filling is stopped, wherein the electronic control unit determines whether the counter is equal to a predetermined time that corresponds to the supply path being filled by the reducing agent, wherein when the counter is equal to the predetermined time, the electronic control unit sets the amount of the return suction of the reducing agent during the purge control to a predetermined amount, wherein when the filling is stopped before the counter reaches the predetermined time, the electronic control unit sets the amount of the return suction of the reducing agent during the purge control to an amount less than the predetermined amount based on the counter, wherein the electronic control unit is configured to calculate the amount of the reducing agent remaining in the supply path and in the adding valve when the internal combustion engine is commanded to stop, wherein the electronic control unit is configured to control the amount of the return suction of the reducing agent in accordance with the calculated remaining amount, and wherein the electronic control unit is configured to calculate the amount of the reducing agent remaining in the supply path and in the adding valve when the internal combustion engine is commanded to stop based on a previous filling amount and operation of the pump.

* * * * *